(12) United States Patent
Li et al.

(10) Patent No.: US 10,371,359 B2
(45) Date of Patent: Aug. 6, 2019

(54) RETAINING STRUCTURE FOR A LIGHT ENGINE

(71) Applicant: LEDVANCE GmbH, Garching (DE)

(72) Inventors: Hao Li, Guangdong (CN); Xiaomian Chen, Guangdong (CN); Peng Chen, Guangdong (CN); Tingming Liu, Guangdong (CN)

(73) Assignee: LEDVANCE GMBH, Garching Bei Munich (DE)

( * ) Notice: Subject to any disclaimer, the term of this patent is extended or adjusted under 35 U.S.C. 154(b) by 0 days.

(21) Appl. No.: 15/902,310

(22) Filed: Feb. 22, 2018

(65) Prior Publication Data

US 2018/0180264 A1    Jun. 28, 2018

Related U.S. Application Data

(63) Continuation of application No. 14/408,968, filed as application No. PCT/EP2013/063565 on Jun. 27, 2013, now Pat. No. 10,001,262.

(30) Foreign Application Priority Data

Jun. 27, 2012 (CN) .......................... 2012 1 0217996

(51) Int. Cl.
  *F21V 21/00* (2006.01)
  *F21V 19/00* (2006.01)
  (Continued)

(52) U.S. Cl.
  CPC .............. *F21V 19/009* (2013.01); *F21K 9/27* (2016.08); *F21K 9/272* (2016.08); *F21V 19/003* (2013.01);
  (Continued)

(58) Field of Classification Search
  CPC . F21K 9/27; F21K 9/272; F21K 9/275; F21K 9/278; F21V 19/003;
  (Continued)

(56) References Cited

U.S. PATENT DOCUMENTS 7,556,396 B2    7/2009  Kuo
8,021,192 B2    9/2011  Takata
(Continued)

FOREIGN PATENT DOCUMENTS

CN      102086986 A     6/2011
CN      102287737 A    12/2011
(Continued)

*Primary Examiner* — Jason M Han
(74) *Attorney, Agent, or Firm* — Hayes Soloway PC (57) ABSTRACT

Various embodiments may relate to an LED retrofit lamp, including a lamp tube, an LED light engine disposed in the lamp tube, and end caps arranged at two open ends of the lamp tube, the LED light engine including a circuit board and at least one light source disposed on the circuit board. The LED retrofit lamp further includes one pair of retaining structures fixed at two opposite ends of the circuit board, respectively, and at least one pair of elastic tension structures connected to the retaining structures. The elastic tension structure goes through the end cap from one side of the end cap and is locked at the other side of the end cap. In addition, various embodiments may also relate to a process for manufacturing the LED retrofit lamp.

20 Claims, 6 Drawing Sheets

(51) Int. Cl.
*F21K 9/27* (2016.01)
*F21K 9/272* (2016.01)
*F21K 9/90* (2016.01)
*F21Y 103/10* (2016.01)
*F21Y 115/10* (2016.01)

(52) U.S. Cl.
CPC .............. *F21V 19/004* (2013.01); *F21K 9/90* (2013.01); *F21Y 2103/10* (2016.08); *F21Y 2115/10* (2016.08); *Y02B 20/386* (2013.01); *Y10T 29/49826* (2015.01)

(58) Field of Classification Search
CPC ............... F21V 19/0035; F21V 19/004; F21V 19/0075; F21V 19/008; F21V 19/009
USPC .......... 362/217.01–217.17, 218–225, 249.02
See application file for complete search history.

(56) References Cited

U.S. PATENT DOCUMENTS

2011/0235320 A1 9/2011 Cai
2012/0218745 A1 8/2012 Dong et al.

FOREIGN PATENT DOCUMENTS

| EP | 2216859 A1 | 8/2010 |
| EP | 2233831 A1 | 9/2010 |
| EP | 2573457 A1 | 3/2013 |
| JP | H10309396 A | 11/1998 |
| JP | 3142817 U | 6/2008 |
| JP | 2009043447 A | 2/2009 |

RETAINING STRUCTURE FOR A LIGHT ENGINE

RELATED APPLICATIONS

The present application is a continuation of U.S. patent application Ser. No. 14/408,968, filed on Dec. 18, 2014, which is a national stage entry according to 35 U.S.C. § 371 of PCT Application No. PCT/EP2013/063565, filed on Jun. 27, 2013, which claims priority from Chinese Patent Application No. 201210217996.2, filed on Jun. 27, 2012. Each of these patent applications is incorporated by reference herein in its entirety.

TECHNICAL FIELD

Various embodiments relate to an LED retrofit lamp. In addition, various embodiments also relate to a process for manufacturing the LED retrofit lamp.

BACKGROUND

As is known to all, LED illumination has irreplaceable advantages. It is energy saving, has very low power consumption, has a nearly 100% electro-optical power conversion, can save more than 80% of energy with the same illumination efficiency compared with the traditional light source, and has a long lifespan. In view of the above advantages, people more and more frequently use LEDs as light sources, for example, numerous LED retrofit lamps in the market. Such LED retrofit lamps have a profile of a traditional light source such as an incandescent lamp or lamp tube, such that they, as light sources, can be adapted to the existing illumination systems.

However, in replacing the traditional T8/T5 lamps, the fixing of the circuit board on which an LED chip is provided and the driver becomes an outstanding issue, as the traditional T8 lamp has a glass lamp tube, and it is very difficult to form, within the glass lamp tube, a fixing structure for fixing an LED light engine and a driver. Of course, people can use plastic lamp tubes to replace glass lamp tubes, but the material for making a plastic lamp tube is absolutely material of optical level. The cost of such material is about 2 times that of normal plastic. Thus, in the related art, a glass lamp tube is usually used.

In the related art, different solutions are proposed to solve the problem that it is difficult to fix an LED light engine and a driver in a glass lamp tube. For example, in an existing solution, an insertion-type aluminum extrusion structure is used, the structures are fixed at the two ends of the circuit board, the circuit board with the extrusion structures fixed at its two ends is inserted in the lamp tube, then the two open ends of the lamp tube are closed with end caps, wherein the extrusion structures are fixed on the end caps, and further, the driver is fixed at one end within the lamp tube. The main disadvantage of this solution is that the structure of the end cap is too complicated.

In another solution in the related art, an insertion-type extrusion base made of aluminum is provided, the base is glued to the bottom of the circuit board, then the circuit board and the base are inserted in the lamp tube, and finally, the base and the lamp tube are glued together. The main disadvantage of this solution is that the fixing between the base and the lamp tube is not firm, and shake may occur.

SUMMARY

In order to solve the above technical problems, various embodiments provide an LED retrofit lamp. The LED retrofit lamp according to various embodiments can be reliably arranged in a glass lamp tube, without the need of using a complicated connection structure. Moreover, it is easier to assemble the LED retrofit lamp. In addition, various embodiments also provide a process for manufacturing the LED retrofit lamp.

There is provided an LED retrofit lamp, including a lamp tube, an LED light engine disposed in the lamp tube, and end caps arranged at two open ends of the lamp tube, wherein the LED light engine includes a circuit board and at least one light source disposed on the circuit board. In addition, the LED retrofit lamp according to various embodiments further includes: one pair of retaining structures fixed at two opposite ends of the circuit board, respectively; and at least one pair of elastic tension structures connected to the retaining structures, wherein the elastic tension structure goes through the end cap from one side of the end cap and is locked at the other side of the end cap. In the LED retrofit lamp according to various embodiments, the LED light engine can be hung in the lamp tube, without the need of a complicated mechanical structure. This is especially essential in the case where the lamp tube is a glass lamp tube, as it is very difficult to form a complicated structure in a glass lamp tube to make the LED light engine. In addition, due to the use of the elastic tension structure in the LED retrofit lamp of the present disclosure, a certain pulling force is applied to the two ends of the circuit board of the LED light engine, that is, the circuit board is tensed in the lamp tube, which has special significance when the LED retrofit lamp is used for a long term, as the LED retrofit lamp usually works at relatively high temperatures for a long time and the devices thereof may deform due to the high temperatures, and the elastic tension structure can reliably retain the light engine, especially the circuit board, in the lamp tube even if the devices deform.

According to various embodiments, the retaining structure includes an intermediate portion, and a first portion and a second portion extending from the intermediate portion, wherein the first portion is connected with the circuit board, and the second portion is connected with the elastic tension structure. Through the simple mechanical structure, the connection between the retaining structure and the circuit board and the connection between the retaining structure and the elastic tension structure are achieved, and such connection does not need any other additional measure, for example, using a bolt or an adhesive, which largely reduces the cost and assembly difficulty.

In various embodiments, the first portion and the second portion are configured as one pair of first legs and at least one pair of second legs extending from the intermediate portion, respectively, wherein the connection line of the first legs and the connection line of the second legs intersect each other, and one elastic tension structure is connected to one pair of second legs. In various embodiments, as the first leg needs to be connected to the circuit board and the second leg needs to be connected to the elastic tension structure, to arrange the connection line of the first legs and the connection line of the second legs intersectionally helps to improve the stability of the elastic tension structure between the circuit board and the end caps.

Advantageously, the first leg includes a first leg front arm and a first leg rear arm forming a predetermined angle therebetween, the first leg front arm having one end connected to the intermediate portion and the other end connected to the first leg rear arm. As the circuit board itself has a certain width, in order that the two first legs can firmly fix the circuit board, the first legs must try to clamp the circuit board, and the first leg front arm provided in accordance with the width of the circuit board must be able to extend to the two sides of the circuit board, enabling the first leg rear arm to clamp the circuit board.

Further advantageously, a locking structure is formed at an end of the first leg rear arm, and a first through hole is formed in the circuit board, the locking structure being engaged with the first through hole. This locking structure can ensure reliable connection between the retaining structure and the circuit board.

According to various embodiments, the second leg includes a second leg front arm and a second leg rear arm forming a predetermined angle there between, the second leg front arm having one end connected to the intermediate portion and the other end connected to the second leg rear arm. In various embodiments, the two second legs jointly constitute one arc-shaped structure accommodating the elastic tension structure, which arc-shaped structure can well disperse the pulling force applied to the elastic tension structure, and thereby, prolong the lifespan of the elastic tension structure. In addition, the second leg front arm and the second leg rear arm form a predetermined angle there between, and this has guiding function for the elastic tension structure, such that the elastic tension structure can be easily aligned with the through holes formed in the end cap, which greatly reduces the difficulty of assembly.

The elastic tension structure is not secured to the second leg through any additional mechanical structure or by an adhesive. Instead, the connection between the elastic tension structure and the second leg is just a loose connection. Thus, it is essential that the second leg has a U-shaped sectional profile which prevents the elastic tension structure from escaping from the second leg.

According to various embodiments, the retaining structure is made by bending a metal plate on which preset bent positions are formed. Such bendable metal plate reduces the manufacture difficulty of the retaining structure, as the retaining structure can be made by just bending the metal plate at the preset bent positions.

Advantageously, the locking structure is configured as a retainer ring with two free ends, which can be moved away each other to open the retainer ring or can be overlapped to close the retainer ring. Since the retaining structure is made by means of the metal plate, a retainer ring can be formed by just bending the end of the first leg rear arm. At the time of connecting the retaining structure to the circuit board, the end of the first leg front arm is bent to form an enclosed retainer ring, and the retainer ring is exactly engaged with the first through holes in the circuit board, such that a reliable mechanical connection is formed.

According to various embodiments, the retaining structure is made of plastic. The retaining structure made of plastic can be manufactured in one process step, which greatly reduces the manufacture difficulty.

In various embodiments, the locking structure is configured as a hook. Such hook can be any hook adapted to be inserted in the first through hole and fixed in the first through hole.

According to various embodiments, the elastic tension structure includes an elastic rod and two stop portions which are formed on the elastic rod and are spaced from each other at a predetermined interval, wherein a section of the elastic rod between the two stop portions is at least partially arranged in the second portion, and the two stop portions are locked at the other side of the same end cap. In various embodiments, each side of the lamp tube is provided with one retaining structure and at least one elastic tension structure. In the case where the lamp tube is relatively short, for example, it is enough to provide one elastic tension structure at each end of the lamp tube, then the retaining structure only needs to have one pair of second legs. In the case where the lamp tube is relatively long, it is necessary to increase the retaining force for the circuit board, then each end of the lamp tube may need to be equipped with two or more elastic tension structure, and thereby, the retaining structure only needs to have two or more pairs of second legs. However, regardless of the number of elastic tension structures, the two free ends of the elastic rod of each elastic tension structure need to go through one end cap from one side of the end cap, and the stop portions deform when going through the end cap, and resume the original shape when reaching the other side of the end cap, such that a reliable connection is formed between the elastic tension structure and the end cap.

In various embodiments, the stop portions are configured to have a conic shape, and bottom surfaces of the two conic-shaped stop portions face each other. The conic-shaped stop portion can go through the second through hole from one side of the end cap more easily, and the bottom surface just can prevent the stop portion from returning to the side of the end cap. The two stop portions cooperate to enable the formation of a reliable connection between the elastic tension structure and the end cap.

Advantageously, at least one pair of second through holes are formed in the end cap for the elastic tension structure to go through. The number of the second through holes depends upon the number of the elastic tension structures on each side of the end cap. If there is one elastic tension structure, one pair of second through holes are enough.

In various embodiments, the elastic rod and the stop portions are made of a rubber or a silicone and are made in one piece. Of course, the elastic tension structure can be made of any other flexible materials having elasticity.

According to various embodiments, the light source is configured as an LED light source. The LED light source has the advantages of high luminous efficiency, long lifespan and environmental protection.

Various embodiments further provide a process for manufacturing an LED retrofit lamp of the above type, the process including the steps of: a) providing two retaining structures; b) fixing the two retaining structures at two opposite ends of the circuit board, respectively; c) providing at least one pair of elastic tension structures, and connecting the elastic tension structure to the retaining structures; and d) enabling the elastic tension structure to go through an end cap from one side of the end cap and be locked at the other side of the same end cap. In the process according to various embodiments, the LED light engine can be hung in the lamp tube without a complicated mechanical structure or an adhesive.

According to various embodiments, in the step a), a metal plate is made by a punching process or a pouring process, wherein preset bent positions are formed on the metal plate, and the retaining structure is formed by bending the metal plate at the preset bent positions, wherein the retaining structure includes an intermediate portion, and one pair of first legs and at least one pair of second legs extending from the intermediate portion, wherein the first legs and the second legs are arranged to be perpendicular to each other. As the first leg needs to be connected to the circuit board and the second leg needs to be connected to the elastic tension structure, to arrange the connection line of the first legs and the connection line of the second legs intersectionally helps to improve the stability of the elastic tension structure between the circuit board and the end caps.

Further preferably, in the step a), the first leg is formed by bending in such a manner that a first leg front arm and a first leg rear arm of the first leg forma predetermined angle there between, and that a retainer ring is formed at an end of the first leg rear arm. The first leg so formed can reliably clamp the circuit board and can be fixed with the circuit board via the retainer ring. In practical assembly process, before the retaining structure is connected with the circuit board, the end of the first leg front arm is an open end in order to fixedly connect the retaining structure with the circuit board, this end is bent and is inserted in the first through hole in the circuit board, so as to form an enclosed retainer ring.

According to various embodiments, in the step a), the second leg is formed by bending in such a manner that the second leg has a U-shaped sectional profile, and that a second leg front arm and a second leg rear arm of the second leg form a predetermined angle there between. The two second legs jointly constitute one arc-shaped structure accommodating the elastic tension structure, which arc-shaped structure can well disperse the pulling force applied to the elastic tension structure, and thereby, prolong the lifespan of the elastic tension structure. In addition, the second leg front arm and the second leg rear arm form a predetermined angle there between, and this has guiding function for the elastic tension structure, such that the elastic tension structure can be easily aligned with the through holes formed in the end cap, which greatly reduces the difficulty of assembly. In addition, the elastic tension structure is not secured to the second leg through any additional mechanical structure or by an adhesive. Instead, the connection between the elastic tension structure and the second leg is just a loose connection. Thus, it is very advantageous that the second leg has a U-shaped sectional profile which prevents the elastic tension structure from escaping from the second leg.

According to various embodiments, in the step a), the retaining structure is formed with plastic by an injection molding process. In addition, in the step a), the first leg is formed in such a manner that a hook is formed at an end of the first leg rear arm of the first leg. The retaining structure can be manufactured by one process step, which greatly reduces the manufacture difficulty of the retaining structure.

According to various embodiments, in the step c), the elastic tension structure is integrally made with a rubber or a silicone by the injection molding process, and the elastic tension structure is formed in such a manner that the elastic tension structure includes an elastic rod and two stop portions which are formed on the elastic rod and are spaced from each other at a predetermined interval. In practical assembly process, two free end portions of the elastic rod go through two second through holes in the end cap, respectively, such that the stop portions go through the second through holes and are locked at the other side of the end cap.

The process according to various embodiments further includes step e) in which a portion of the elastic rod on the other side of the end cap is cut off in order to facilitate the assembly, the elastic rod usually has relatively long free ends for pulling the elastic rod at the time of assembly such that the stop portions formed thereon go through the second through holes. However, after the assembly is completed, the free ends are of no use, and are not beautiful, then to cut off the free ends can make the LED retrofit lamp have a good appearance. It is to be understood that the features of the various exemplary embodiments described herein may be combined with each other, unless specifically noted otherwise.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which.

DETAILED DESCRIPTION

The following detailed description refers to the accompanying drawing that show, by way of illustration, specific details and embodiments in which the disclosure may be practiced.

Figure 1:
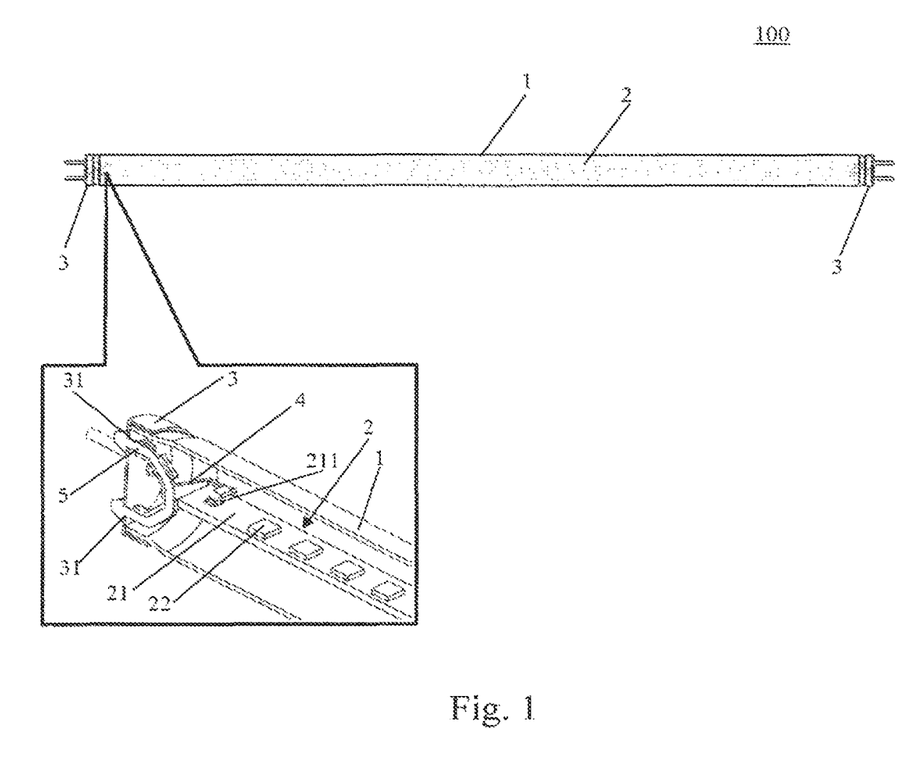
FIG. 1 is a sectional view of one end region of the LED retrofit lamp according to the present disclosure.

FIG. 1 is a sectional view of one end region of the LED retrofit lamp 100 according to the present disclosure. The upper region of FIG. 1 shows a complete LED retrofit lamp, from which it can be seen that, the LED retrofit lamp 100 includes a lamp tube 1, an LED light engine 2 disposed in the lamp tube 1, and end caps 3 arranged at two open ends of the lamp tube 1, wherein the LED light engine includes a circuit board 21 and at least one light source disposed on the circuit board 21, and in the design solution of the present disclosure, the light source is an LED light source 22. The lower region of FIG. 1 is a detailed view of one end of the lamp tube 1. As the other end of the lamp tube 1 has the same structure, just one end of the lamp tube 1 is described here. As can be seen from the figure, the LED retrofit lamp 100 further includes: one pair of retaining structures 4 arranged at two ends of the lamp tube 1, respectively, the retaining structures 4 being fixed at two opposite ends of the circuit board 21, respectively, each end of the lamp tube 1 being provided with one retaining structure 4; and at least one pair of elastic tension structures 5 connected to the retaining structures 4. In the present embodiment, at least one pair of second through holes 31 are formed on the end cap 3 for the elastic tension structure 5 to go through.

In various embodiments, each end of the lamp tube 1 is provided with one elastic tension structure 5. However, the number of the elastic tension structures 5 can be plural, depending upon the length of the lamp tube 1. For example, for a 2-feet lamp tube, each end of the lamp tube 1 is provided with one elastic tension structure 5, while for a 4-feet or 5-feet lamp tube 1, each end of the lamp tube 1 is provided with two or more elastic tension structures 5. In addition, as can be further seen from the figure, the elastic tension structure 5 goes through the end cap 3 from one side of the end cap 3 and is locked at the other side of the end cap 3.

Figure 2:
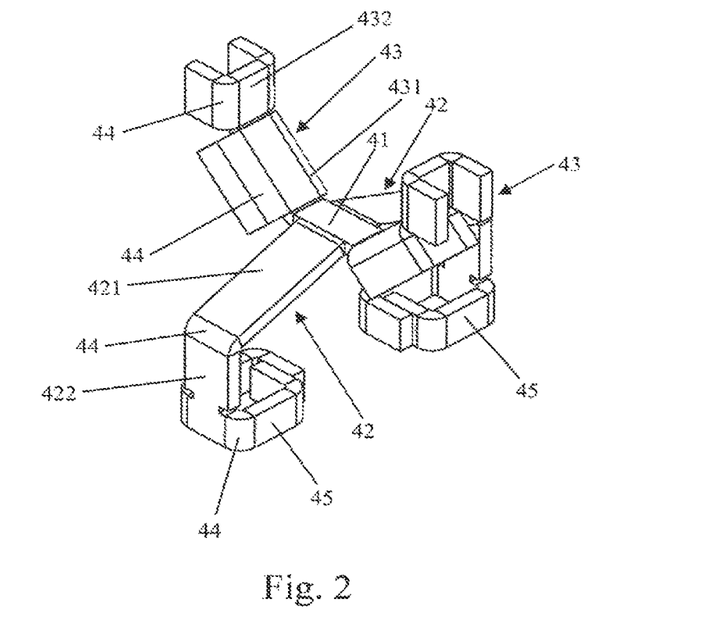
FIG. 2 is a schematic diagram of the retaining structure of the LED retrofit lamp according to the present disclosure.

FIG. 2 is a schematic diagram of the retaining structure 4 of the LED retrofit lamp 100 according to the present disclosure. As can be seen from the figure, the retaining structure 4 includes an intermediate portion 41, and a first portion and a second portion extending from the intermediate portion 41, wherein the first portion is connected with the circuit board 21, and the second portion is connected with the elastic tension structure 5. In the present embodiment, the first portion and the second portion are configured as one pair of first legs 42 and at least one pair of second legs 43 extending from the intermediate portion 41, respectively, wherein the connection line of the first legs 42 and the connection line of the second legs 43 intersect each other, and one of the elastic tension structures 5 is connected to one pair of second legs 43. If each end of the lamp tube 1 is provided with multiple elastic tension structures 5, then the number of the second legs 43 can be correspondingly increased. In addition, as can be further seen from the figure, the first leg 42 includes a first leg front arm 421 and a first leg rear arm 422 forming a predetermined angle there between, the first leg front arm 421 having one end connected to the intermediate portion 41 and the other end connected to the first leg rear arm 422; and the second leg 43 includes a second leg front arm 431 and a second leg rear arm 432 forming a predetermined angle there between, the second leg front arm 431 having one end connected to the intermediate portion 41 and the other end connected to the second leg rear arm 432. In this way, the retaining structure 4 is spatially has a structure formed by two C-shaped portions which face away from each other and intersect each other.

In addition, as can be further seen from the figure, a locking structure is formed at an end of the first leg rear arm 422, and two first through holes 211 (but only one first through hole 211 is shown in FIG. 1) are formed in the circuit board 21, the locking structure being engaged with the first through hole 211. In the present embodiment, the retaining structure 4 is made by bending a metal plate on which preset bent positions 44 are formed (see the left side view in FIG. 2), and the retaining structure 4 having a shape described above can be simply obtained by bending the metal plate at the preset bent positions 44. In the present embodiment, the locking structure is configured as a retainer ring 45 with two free ends, which can be moved away each other to open the retainer ring 45 or can be overlapped to close the retainer ring 45. Since the retaining structure 4 is made by means of the metal plate, a retainer ring 45 can be formed by just bending the end of the first leg rear arm 422. At the time of connecting the retaining structure 4 to the circuit board 21, the end of the first leg rear arm 422 is bent to form an enclosed retainer ring 45, and the retainer ring 45 is exactly engaged with the first through holes 211 in the circuit board 21, such that a reliable mechanical connection is formed.

In the second embodiment of the present disclosure which is not shown, the retaining structure 4 is made of plastic. Since plastic cannot be bent, a hook which serves as the locking structure can be directly formed at the end of the first leg rear arm 422. The hook can be directly engaged with the first through hole 211.

In addition, as can be further seen from FIG. 2, the second leg 43 has a U-shaped sectional profile which prevents the elastic tension structure 5 from escaping from the second leg 43 in the present embodiment, wings are formed on the second leg 43 by bending the metal plate at the preset bent positions 44, thereby a U-shaped slot is formed, and the elastic tension structure 5 is partially arranged in the U-shaped slot.

Figure 3:
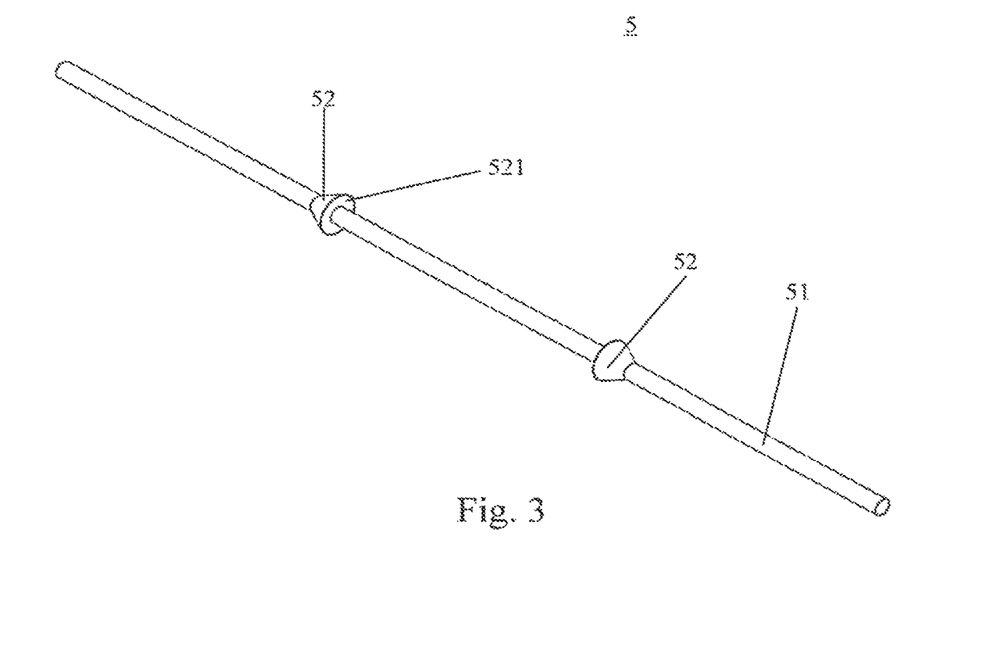
FIG. 3 is a schematic diagram of the elastic tension structure of the LED retrofit lamp according to the present disclosure.

FIG. 3 is a schematic diagram of the elastic tension structure of the LED retrofit lamp according to the present disclosure. As can be seen from the figure, the elastic tension structure 5 includes an elastic rod 51 and two stop portions 52 which are formed on the elastic rod 51 and are spaced from each other at a predetermined interval, wherein a section of the elastic rod 51 between the two stop portions 52 is at least partially arranged in the C-shaped second portion formed by the second leg 43. As can be further seen from the figure, the stop portions 52 are configured to have a conic shape, and bottom surfaces 521 of the two conic-shaped stop portions 52 face each other. The conic-shaped stop portion 52 can go through the second through hole 31 from one side of the end cap 3 more easily, and the bottom surface 521 just can prevent the stop portion 52 from returning to the side of the end cap 3. The two stop portions 52 cooperate to enable the formation of a reliable connection between the elastic tension structure 5 and the end cap 3.

In the present embodiment, the elastic rod 31 and the stop portions 52 are made of a rubber or a silicone and are made in one piece. Of course, the elastic rod 51 and the stop portions 52 can be made of any other flexible materials having elasticity.

Figure 4A:
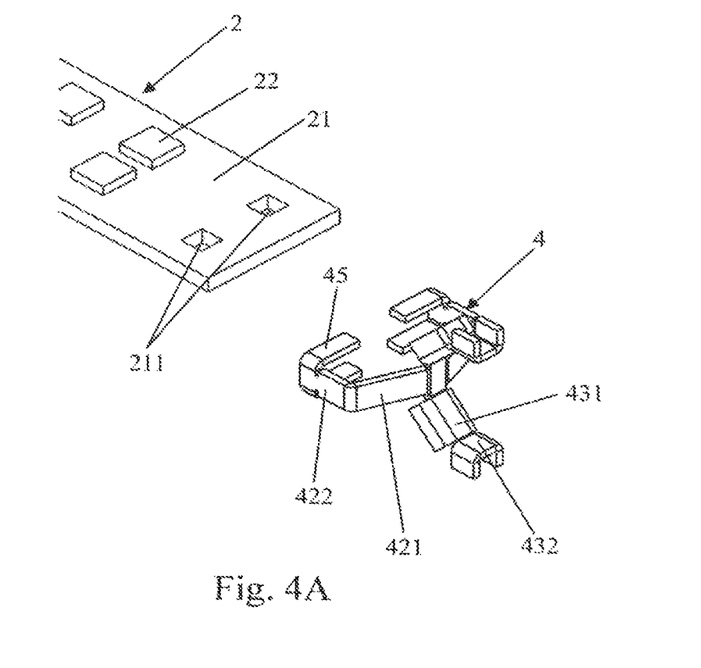
FIGS. 4A to 4C are diagrams showing the process of fixing the retaining structure to the circuit board.
Figure 4B:
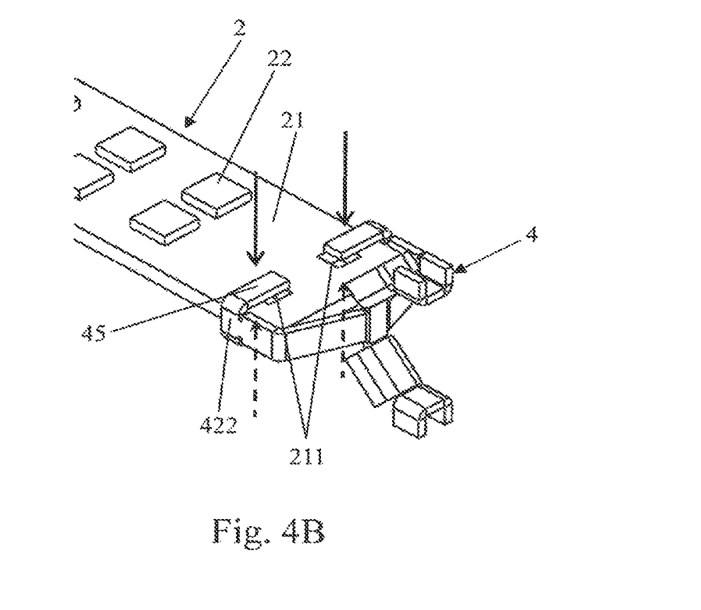
Figure 4C:
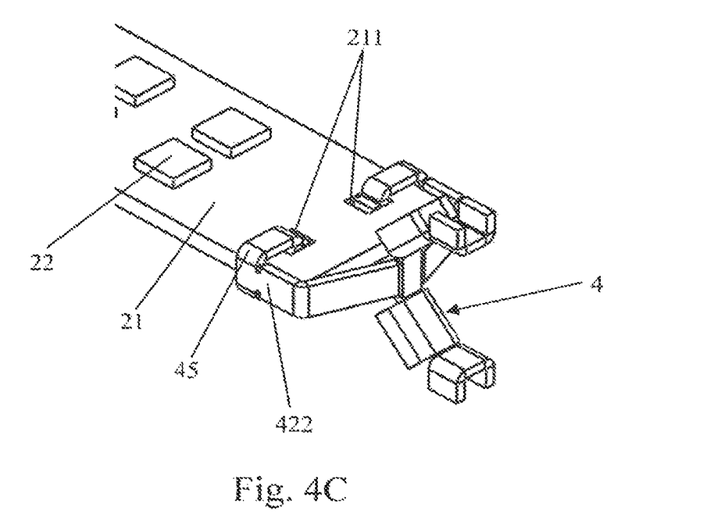

FIGS. 4A to 4C are diagrams showing the process of fixing the retaining structure 4 to the circuit board 21. As can be seen from FIG. 4A, the end of the first leg rear arm 422 is not closed. In FIG. 4B, the retaining structure 4 has already clamped the circuit board 21, and the end of the first leg rear arm 422 has already been aligned with the first through hole 211 in the circuit board 21. As can be seen from FIG. 4C, the end of the first leg rear arm 422 has already been bent and inserted in the first through hole 211, which thereby forms a reliable connection between the retaining structure 4 and the circuit board 21.

FIGS. 5A to 5E are diagrams showing the process of manufacturing the LED retrofit lamp 100. In the process of various embodiments, two retaining structures 4 are provided in step a). In the first embodiment of the process of the present disclosure, a metal plate is made by a punching process or a pouring process, wherein preset bent positions 44 are formed on the metal plate, and the retaining structure 4 is formed by bending the metal plate at the preset bent positions 44, wherein the retaining structure 4 includes an intermediate portion 41, and one pair of first legs 42 and at least one pair of second legs 43 extending from the intermediate portion 41, wherein the first legs 42 and the second legs 43 are arranged to be perpendicular to each other. Moreover, in step a), the first leg 42 is formed by bending in such a manner that a first leg front arm 421 and a first leg rear arm 422 of the first leg 42 form a predetermined angle there between, and that a retainer ring 45 is formed at an end of the first leg rear arm 422. In addition, in step a), the second leg 43 is formed by bending in such a manner that the second leg 43 has a U-shaped sectional profile, and that a second leg front arm 431 and a second leg rear arm 432 of the second leg 43 form a predetermined angle there between.

In another embodiment of the process according to the present disclosure, in step a), the retaining structure 4 is formed with plastic by an injection molding process, and in step a), the first leg 42 is formed in such a manner that a hook is formed at an end of the first leg rear arm 422 of the first leg 42.

Figure 5A:
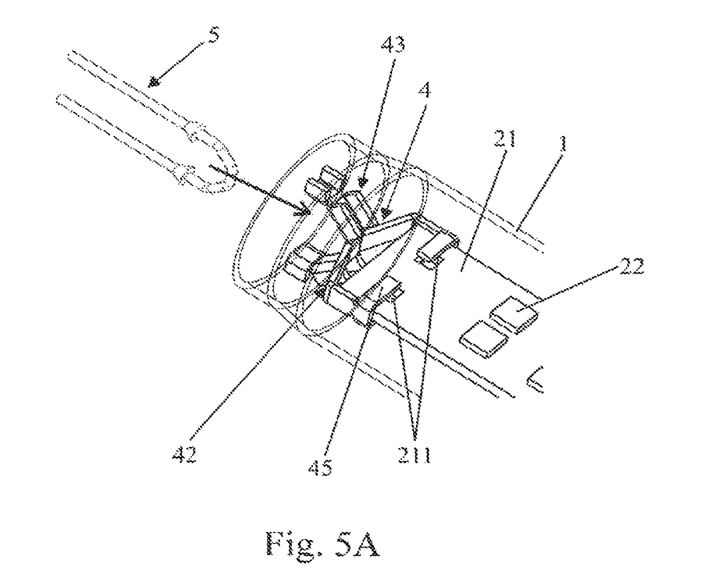
FIGS. 5A to 5E are diagrams showing the process of manufacturing the LED retrofit lamp.

In step b) shown in FIG. 5A, the two retaining structures 4 are fixed at two opposite ends of the circuit board 21, respectively. Meanwhile, in step c), an elastic tension structure 5 is provided. In the present embodiment, the elastic tension structure 5 is integrally made with a rubber or a silicone by the injection molding process, and the elastic tension structure 5 is formed in such a manner that the elastic tension structure 5 includes an elastic rod 51 and two stop portions 52 which are formed on the elastic rod 51 and are spaced from each other at a predetermined interval.

Figure 5B:
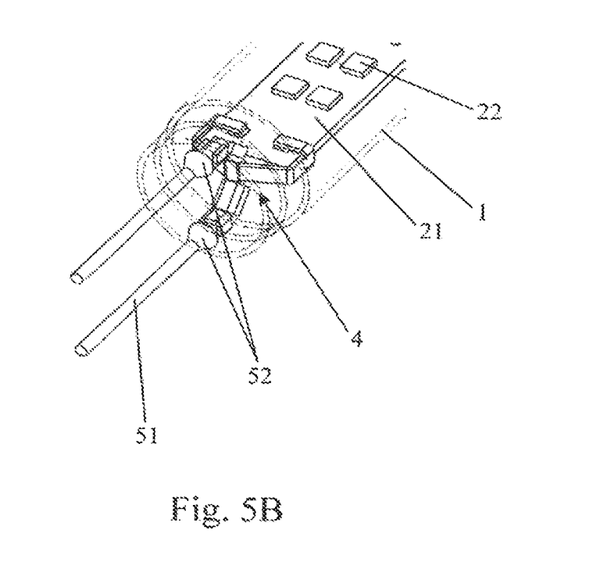

As can be seen from FIG. 5B, the elastic tension structure 5 has already been connected to the retaining structure 4 in the present embodiment, a section of the elastic rod 51 between the two stop portions 52 is at least partially arranged in the second portion formed by two second legs 43.

Figure 5C:
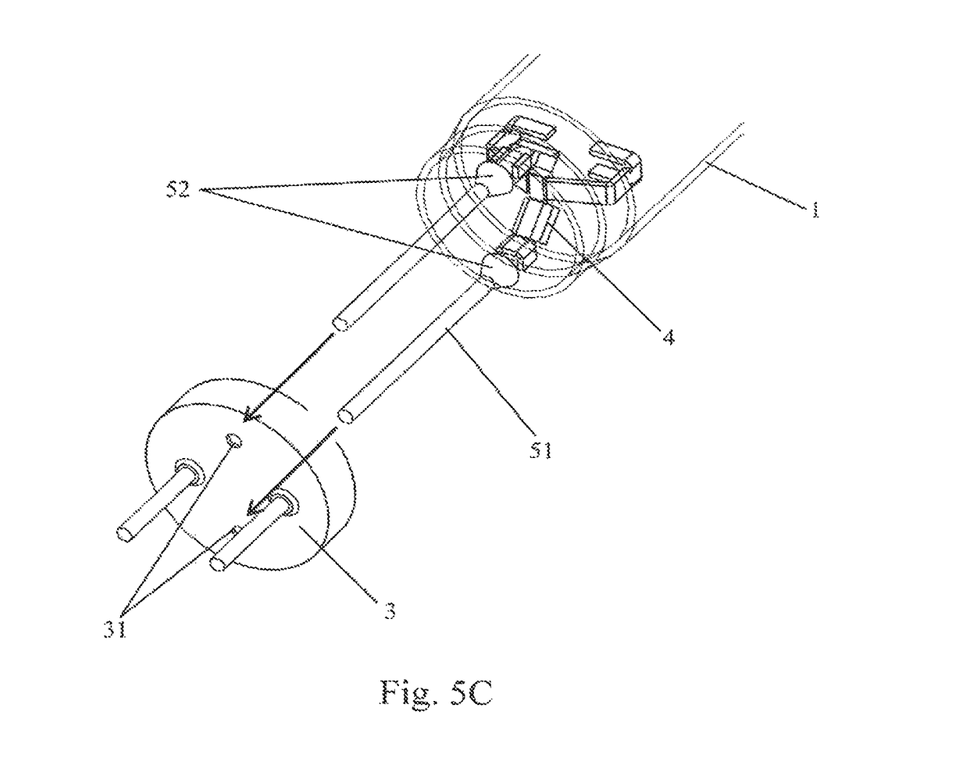

As can be seen from FIG. 5C, two second through holes are formed in the end cap 3. The end caps 3 covers the open ends of the lamp tube 1, and at this time, the two free ends of the elastic rod 51 of the elastic tension structure 5 are made to go through the second through holes 31 from one side of an end cap 3, and meanwhile, the two free ends are pulled, such that the stop portions 52 also go through the second through holes 31 and are locked on the other side of the end cap 3. As can be seen from FIG. 5D, the stop portions 52 have already been on the other side of the end cap 3.

Figure 5D:
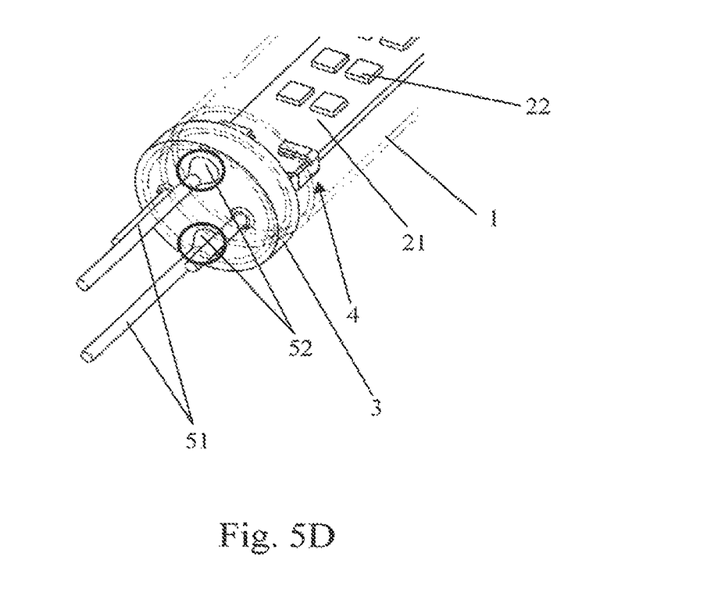
Figure 5E:
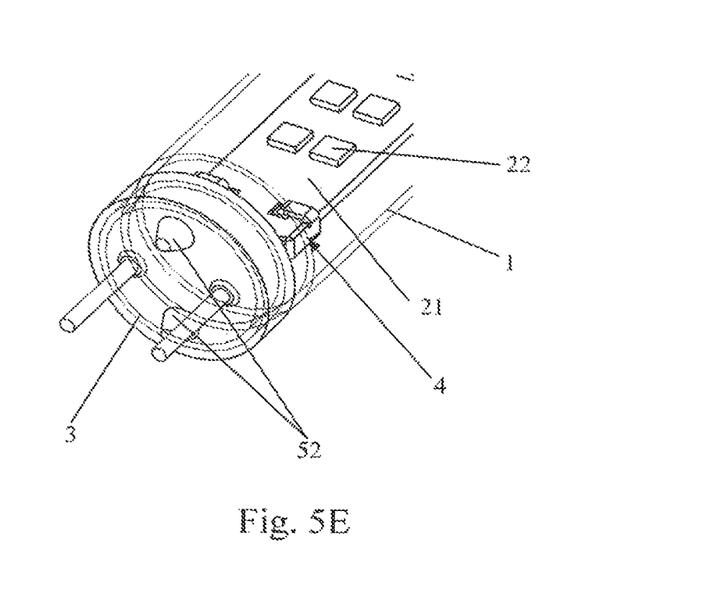

As can be seen from FIG. 5D, the portion of the elastic rod 51 on the other side of the end cap 3 has already been cut off in step e).

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

What is claimed is:

1. A retaining structure for a light engine of a solid-state lamp, the retaining structure comprising:
   an intermediate portion;
   a first portion extending from the intermediate portion and configured to engage a circuit board of the light engine; and
   a second portion extending from the intermediate portion and configured to engage an elastic tension structure;
   wherein the retaining structure is configured to be at least partially inserted within a lamp tube of the solid-state lamp such that, with engagement of the second portion and the elastic tension structure, the elastic tension structure applies tension that biases the light engine toward an end of the lamp tube.

2. The retaining structure of claim 1, wherein the first portion comprises:
   a first leg portion comprising a first arm portion configured to engage a first through-hole of the circuit board of the light engine; and
   a second leg portion comprising a second arm portion configured to engage a second through-hole of the circuit board of the light engine.

3. The retaining structure of claim 2, wherein:
   the first arm portion is bendable to provide a first retainer ring portion at an end of the first portion distal to the intermediate portion, wherein the first retainer ring portion is configured to be at least partially inserted through the first through-hole of the circuit board of the light engine in having the first portion engage the circuit board of the light engine; and
   the second arm portion is bendable to provide a second retainer ring portion at an end of the second portion distal to the intermediate portion, wherein the second retainer ring portion is configured to be at least partially inserted through the second through-hole of the circuit board of the light engine in having the second portion engage the circuit board of the light engine.

4. The retaining structure of claim 3, wherein:
   the first retainer ring portion is configured to at least partially overlap itself in the first through-hole of the circuit board; and
   the second retainer ring portion is configured to at least partially overlap itself in the second through-hole of the circuit board.

5. The retaining structure of claim 2, wherein:
   the first arm portion comprises a first hook portion disposed at an end of the first portion distal to the intermediate portion, wherein the first hook portion is configured to be at least partially inserted through the first through-hole of the circuit board of the light engine in having the first portion engage the circuit board of the light engine; and
   the second arm portion comprises a second hook portion disposed at an end of the second portion distal to the intermediate portion, wherein the second hook portion is configured to be at least partially inserted through the second through-hole of the circuit board of the light engine in having the second portion engage the circuit board of the light engine.

6. The retaining structure of claim 2, wherein the first arm portion and the second arm portion are disposed opposite one another within a common plane.

7. The retaining structure of claim 2, wherein the second portion comprises:
   a third leg portion comprising a third arm portion configured to engage the elastic tension structure; and
   a fourth leg portion comprising a fourth arm portion configured to engage the elastic tension structure.

8. The retaining structure of claim 7, wherein each of the third arm portion and the fourth arm portion is of generally U-shaped cross-sectional profile such that, in engaging the elastic tension structure, the elastic tension structure is prevented from escaping the second portion.

9. The retaining structure of claim 7, wherein the second portion is configured such that, in engaging the elastic tension structure, the elastic tension structure passes along the third leg portion, along the intermediate portion between the circuit board and the intermediate portion, and along the fourth leg portion.

10. The retaining structure of claim 7, wherein the third arm portion and the fourth arm portion are disposed opposite one another within a common plane.

11. The retaining structure of claim 7, wherein the first portion and the second portion extend from the intermediate portion such that:
   the first arm portion and the second arm portion oppose one another within a first common plane;
   the third arm portion and the fourth arm portion oppose one another within a second common plane; and
   the first common plane and the second common plane are orthogonal to one another.

12. The retaining structure of claim 1, wherein the first portion and the second portion face away from each other and intersect each other.

13. The retaining structure of claim 1, wherein a connection line of the first portion and a connection line of the second portion intersect each other.

14. The retaining structure of claim 1, wherein each of the first portion and the second portion is generally C-shaped.

15. The retaining structure of claim 1, wherein the retaining structure is comprised entirely of a plastic or a metal.

16. An assembly comprising:
the retaining structure of claim 1; and
the elastic tension structure, wherein the elastic tension structure is comprised of a rubber or a silicone.

17. The assembly of claim 16, wherein the elastic tension structure comprises:
an elastic rod portion;
a first stop portion formed along a length of the elastic rod portion and configured to pass through a first through-hole of an end cap of the solid-state lamp such that the first stop portion does not pass readily back through the first through-hole after having passed through the first through-hole; and
a second stop portion formed along the length of the elastic rod portion and configured to pass through a second through-hole of the end cap of the solid-state lamp such that the second stop portion does not pass readily back through the second through-hole after having passed through the second through-hole.

18. The assembly of claim 17, wherein at least one of the first stop portion and the second stop portion is of generally conic shape.

19. The assembly of claim 18, wherein:
the first stop portion includes a first base surface;
the second stop portion includes a second base surface; and
the first base surface and the second base surface face each other along the length of the elastic rod portion.

20. The assembly of claim 17, wherein the elastic tension structure is formed as a singular piece.

* * * * *